June 16, 1931. L. J. SAUER 1,810,296
BEARING CONSTRUCTION
Filed Jan. 17, 1929
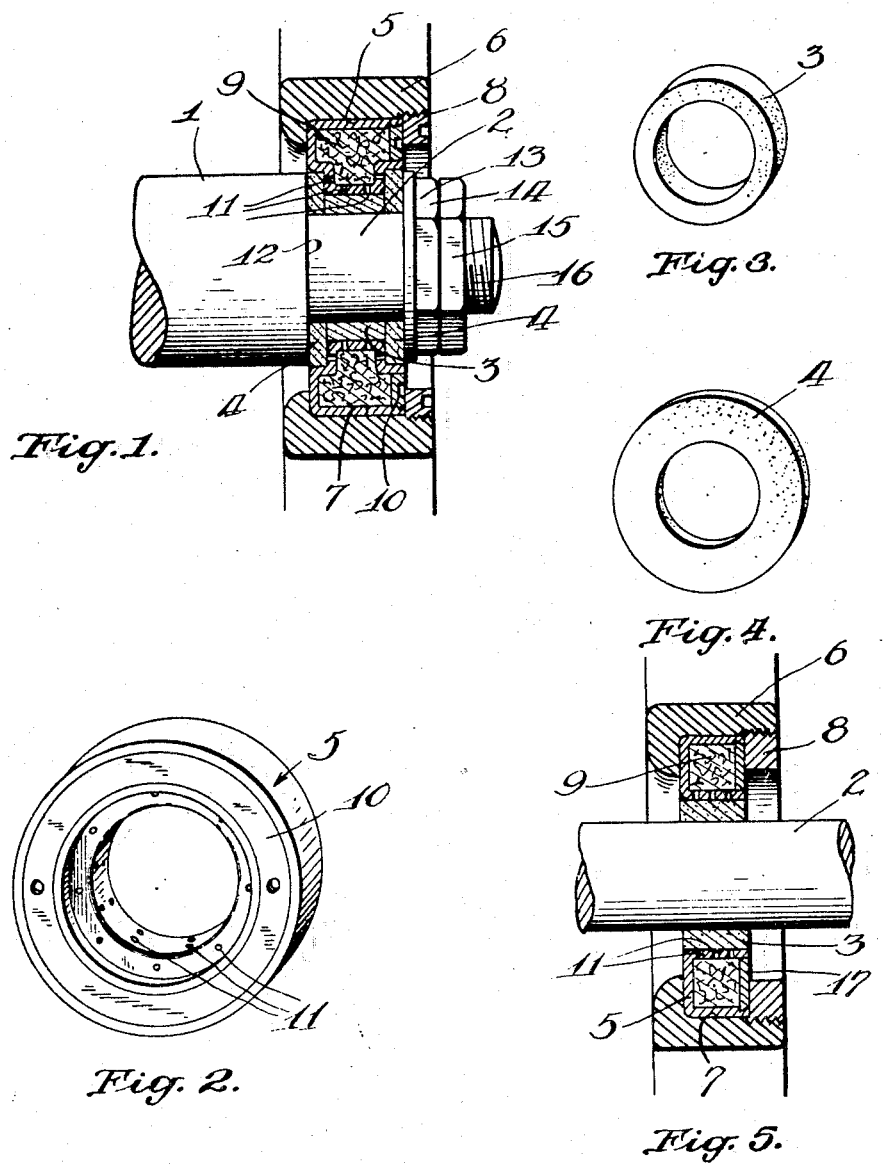

Patented June 16, 1931

1,810,296

UNITED STATES PATENT OFFICE

LOUIS J. SAUER, OF OAK PARK, ILLINOIS, ASSIGNOR TO CHARLES H. JOY, SR., OF CHICAGO, ILLINOIS

BEARING CONSTRUCTION

Application filed January 17, 1929. Serial No. 333,120.

My invention relates to a bearing construction.

One of the objects of my invention is to provide means for keeping an oil impregnated metal bearing ring supplied with oil.

A further object is to provide improved means for supporting such a bearing ring.

A further object is to provide a supporting bushing member for an oil impregnated metal bearing ring which will enable the bearing to be used in those places where heretofore a ballbearing has been used, without necessitating any change in the size of the parts.

A further object of my invention is to provide a supporting ring for an oil impregnated bearing ring which supporting ring will contain a supply of lubricant for the oil impregnated ring.

Further objects will appear from the description and claims.

In the drawings in which two forms of my invention are shown:

Figure 1 is an axial section through a bearing construction;

Fig. 2 is a perspective view showing the annular supporting and lubricant containing member;

Fig. 3 is a perspective view of the oil impregnated bearing ring for radial pressure;

Fig. 4 is a perspective view of the oil impregnated ring for end thrust; and

Fig. 5 shows a bearing construction for taking care of radial pressure.

Referring now to the drawings in detail, and first to the construction of Figs. 1 to 4 inclusive, this comprises a rotatable shaft 1 having a reduced bearing portion 2, an oil impregnated metal bearing ring 3 for taking care of the radial pressure, a pair of oil impregnated bearing rings 4 for taking care of the end thrust, a sheet metal oil containing and ring-supporting member 5 in which all three of the oil impregnated bearing members have a snug force fit, and a supporting member 6 having a circular recess 7 in which the annular sheet metal member 5 has a snug fit and in which it is held by means of the threaded securing ring 8.

The annular supporting and housing member 5 may be filled with a packing material 9 containing a suitable lubricant, this packing material being held in the housing member by means of a cover ring 10 having threaded engagement with the member 5. In order to enable the lubricant in the packing material to reach the metal rings and keep them impregnated with oil, a number of small openings 11 are provided in the inner portion of the member 5 through which oil may flow from the packing 9 to the bearing rings 3 and 4.

The rotatable shaft has a shoulder portion engaging one of the thrust bearing rings 4 and is provided with a thrust collar 13 for engagement with the other thrust bearing ring 4, the thrust collar being held in place by means of a securing nut 14 and a lock-nut 15 threaded on the reduced end 16 of the shaft 1.

The construction shown in Fig. 5 is substantially the same as that shown in Fig. 1, except that here no provision is made for end thrust, this being a pure radial bearing, and that the packing 9 is held in place by means of a snap ring 17 having a bevelled edge which can be snapped into place in an annular groove in the member 5.

While I have shown but two forms of my invention, it is obvious that it may be embodied in other forms covered and defined by the appended claims.

I claim:

1. A bearing construction comprising an oil impregnated metal bearing ring in which the shaft turns, and means for supporting said ring and keeping it supplied with oil, comprising an annular metal housing and supporting ring to be fitted into a circular opening in a supporting member, said supporting ring being coaxial with said bearing ring and serving as a support against radial movement thereof, and lubricating material in said annular housing and supporting member from which oil is supplied to the bearing ring supported thereby to keep it impregnated with lubricating material.

2. A bearing construction comprising an oil impregnated metal bearing ring in which the shaft turns, and means for supporting said ring and keeping it supplied with oil, comprising an annular metal housing and supporting ring to be fitted into a circular opening in a supporting member, said supporting ring being coaxial with said bearing ring and serving as a support against radial movement thereof, and lubricating material in said annular housing and supporting member from which oil is supplied to the bearing ring supported thereby to keep it impregnated with lubricating material, said housing and supporting member having openings leading from the interior thereof to the bearing ring through which oil passes from the housing to the bearing ring.

In witness whereof, I have hereunto subscribed my name.

LOUIS J. SAUER.